United States Patent
Castor et al.

(10) Patent No.: US 9,557,429 B2
(45) Date of Patent: Jan. 31, 2017

(54) SYSTEMS AND METHODS FOR REDUCING NOISE IN A SEISMIC VIBRATORY SOURCE

(71) Applicant: CGG SERVICES SA, Massy Cedex (FR)

(72) Inventors: Kaelig Castor, Paris (FR); Olivier Winter, Houston, TX (US); Thomas Bianchi, Paris (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 15/051,942

(22) Filed: Feb. 24, 2016

(65) Prior Publication Data

US 2016/0170049 A1 Jun. 16, 2016

Related U.S. Application Data

(63) Continuation of application No. PCT/IB2014/003133, filed on Dec. 19, 2014.

(60) Provisional application No. 61/920,295, filed on Dec. 23, 2013.

(51) Int. Cl.
*G01V 1/00* (2006.01)
*G01V 1/04* (2006.01)

(52) U.S. Cl.
CPC ..................................... *G01V 1/04* (2013.01)

(58) Field of Classification Search
CPC .. G01V 1/02; G01V 1/04; G01V 1/143–1/155
See application file for complete search history.

(56) References Cited

U.S. PATENT DOCUMENTS

| 3,895,343 A | 7/1975 | Farr |
| 4,751,687 A | 6/1988 | Christensen |
| 6,035,257 A | 3/2000 | Epperson |
| 2012/0037445 A1 | 2/2012 | Eick et al. |

FOREIGN PATENT DOCUMENTS

EP    1 972 963 A1    1/2008

OTHER PUBLICATIONS

Guitton, Robust inversion of seismic data using Huber norm, Geophysics vol. 68, No. 4, (Jul.-Aug. 2003), p. 1310-1319.*
International Search Reporting mailed on Aug. 21, 2015 in corresponding application No. PCT/IB2014/003133.
Written Opinion mailed on Aug. 21, 2015 in corresponding application No. PCT/IB2014/003133.

* cited by examiner

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

A system and method for reducing noise in a seismic vibratory source is disclosed. The method includes generating an initial pilot signal for the seismic vibratory source, receiving a source signature based on the initial pilot signal, estimating a noise component of the source signature based on the source signature and the initial pilot signal, generating an anti-noise correction for the initial pilot signal based on the noise component of the source signature, and computing a modified pilot signal based on the initial pilot signal and the anti-noise correction.

14 Claims, 14 Drawing Sheets

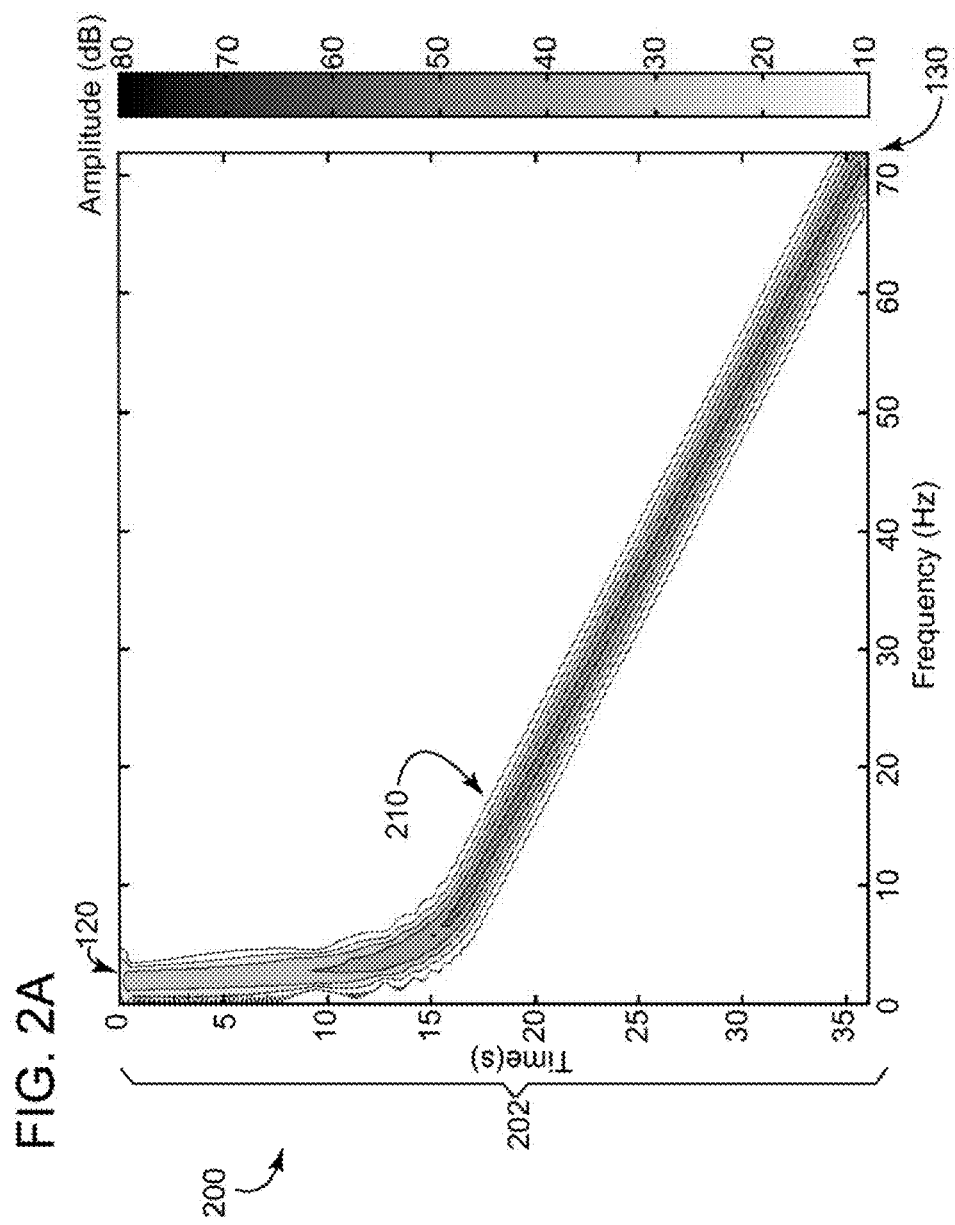

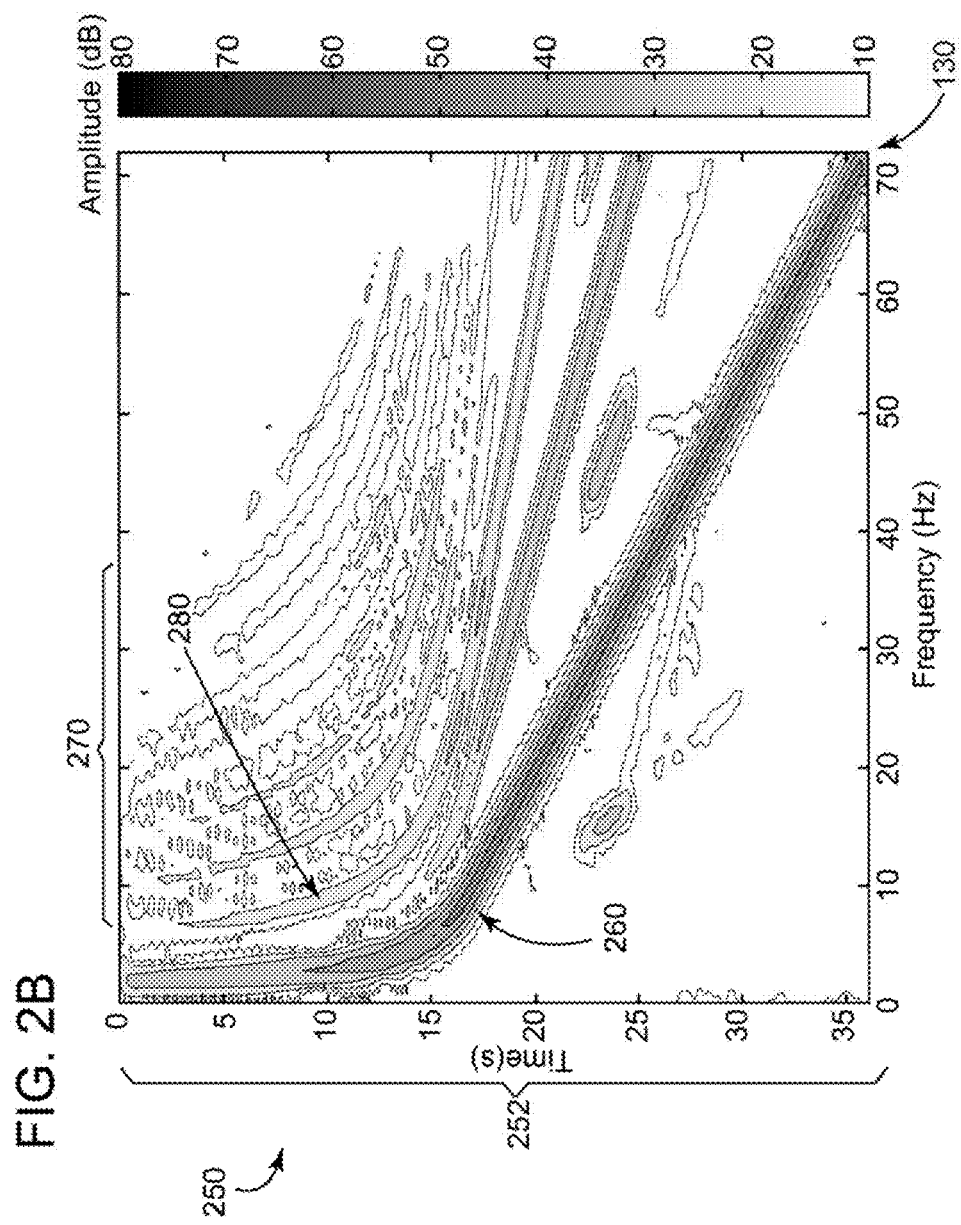

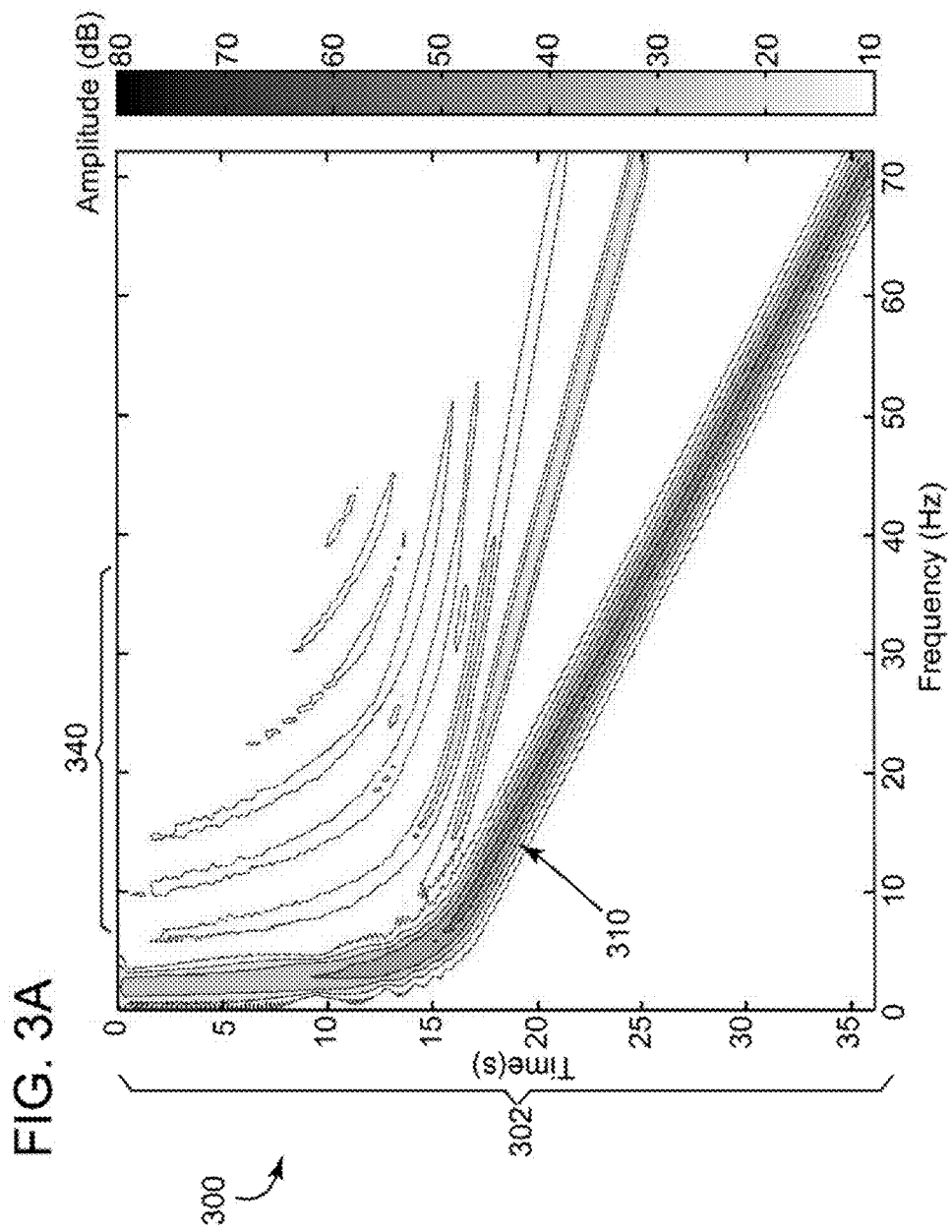

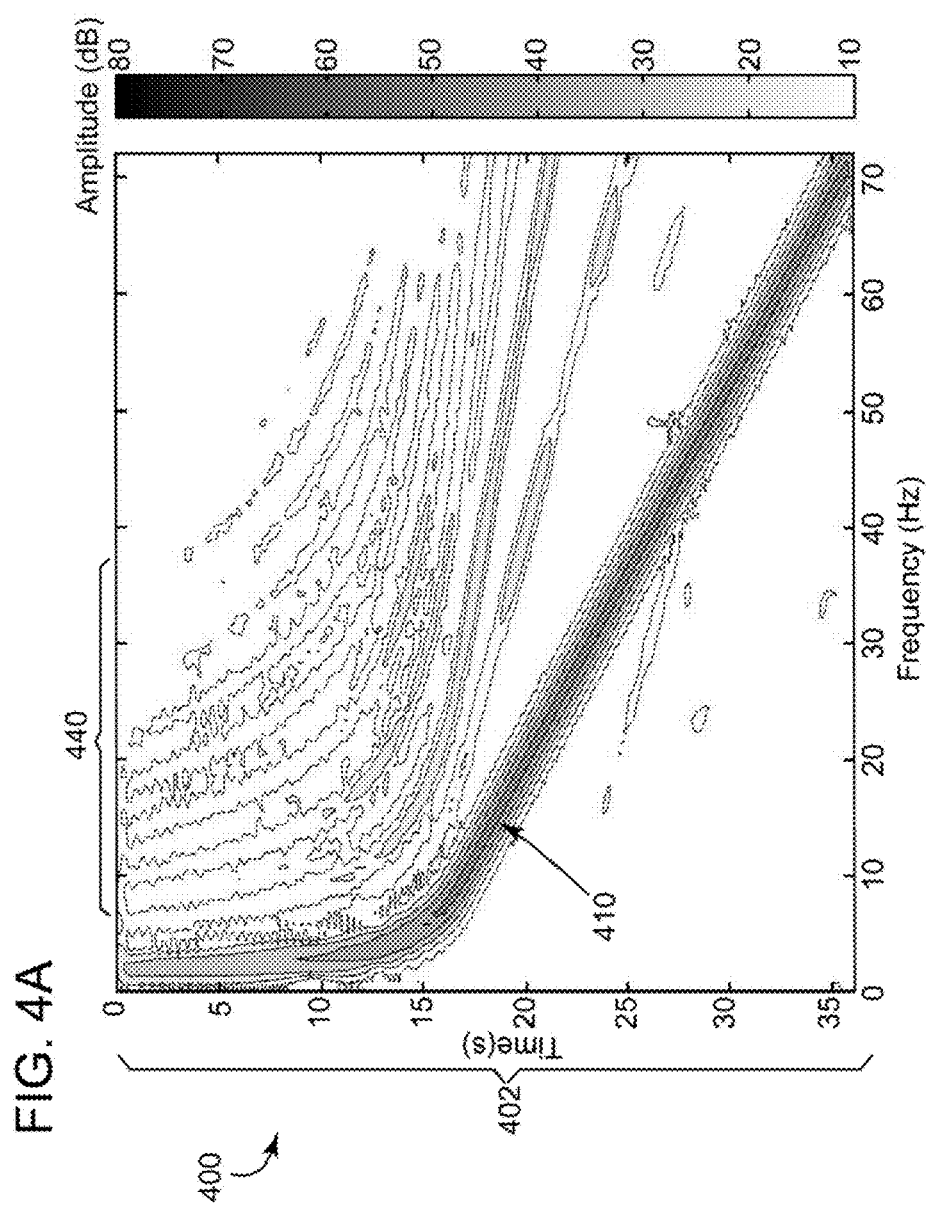

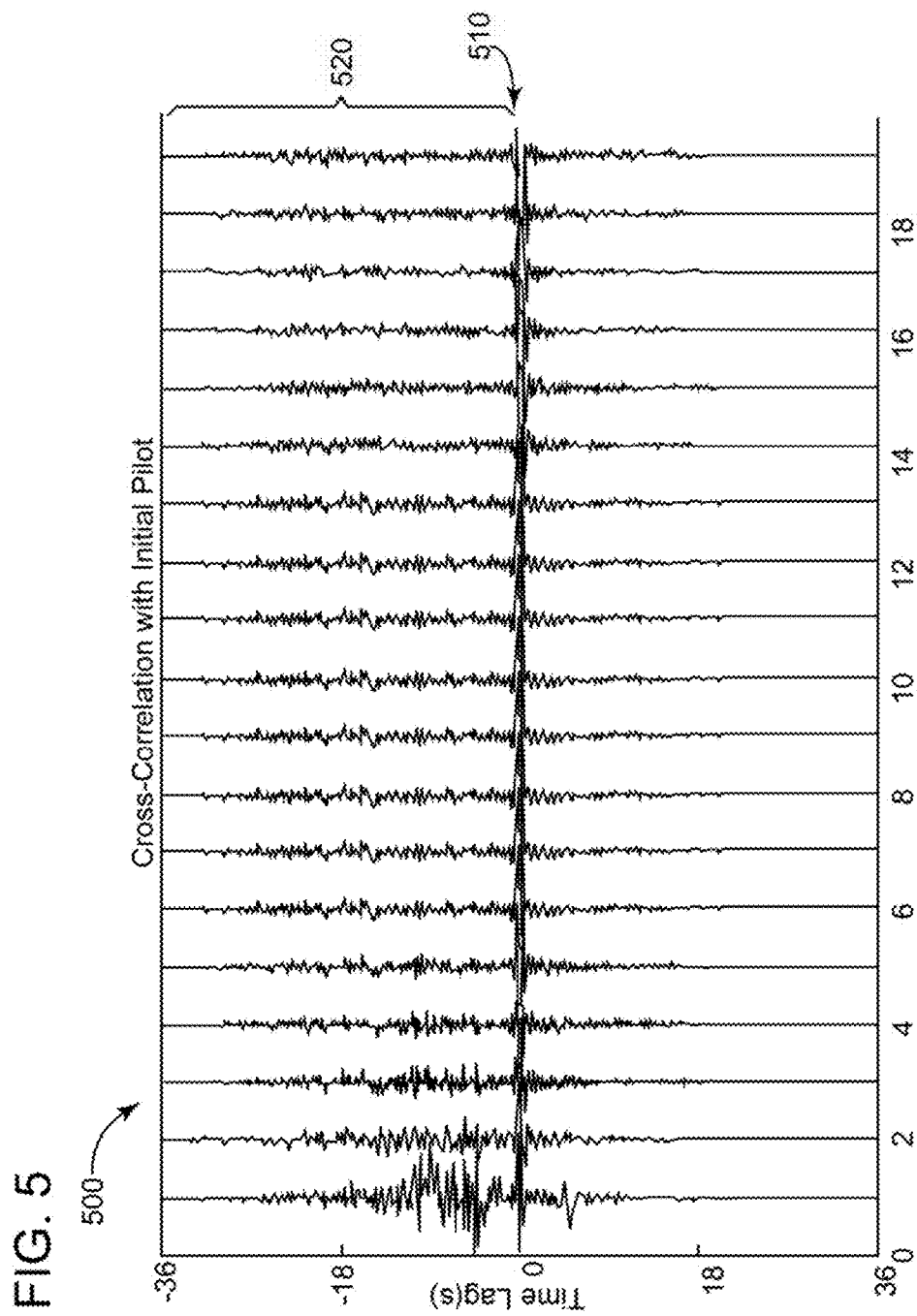

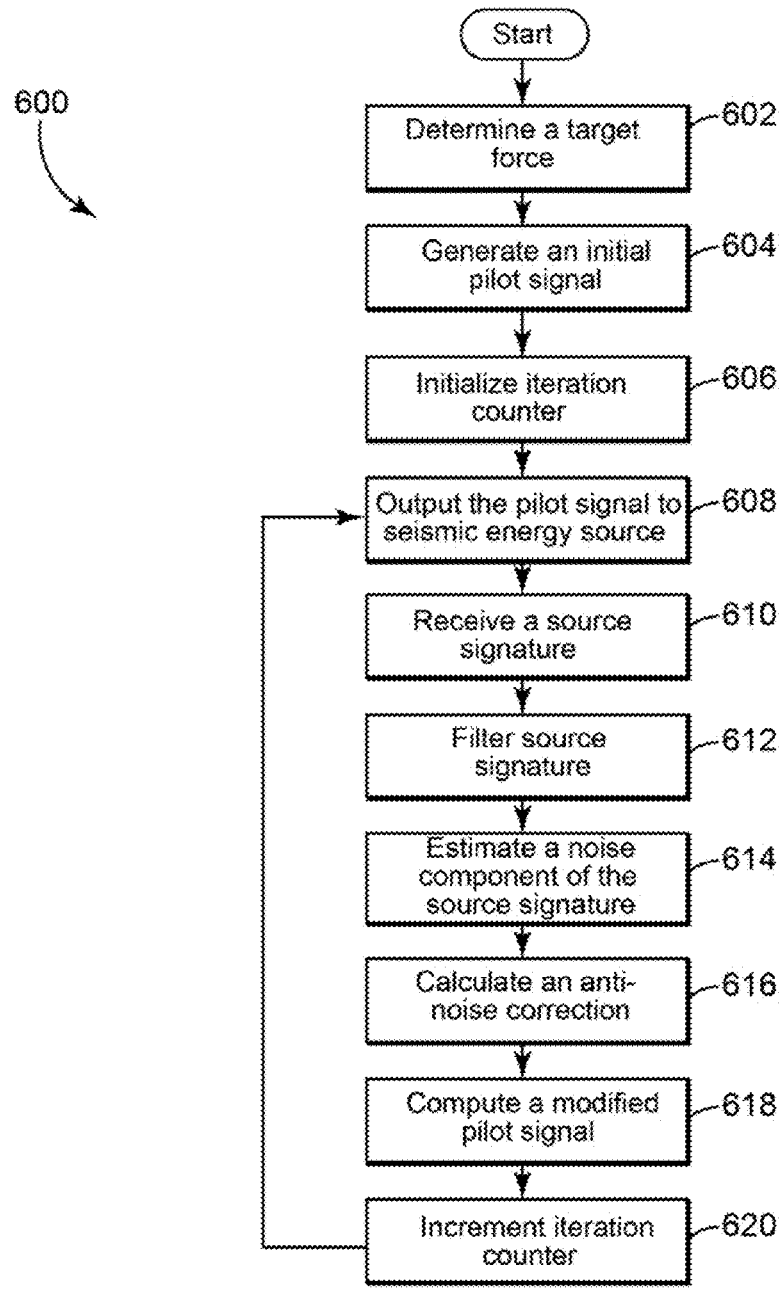

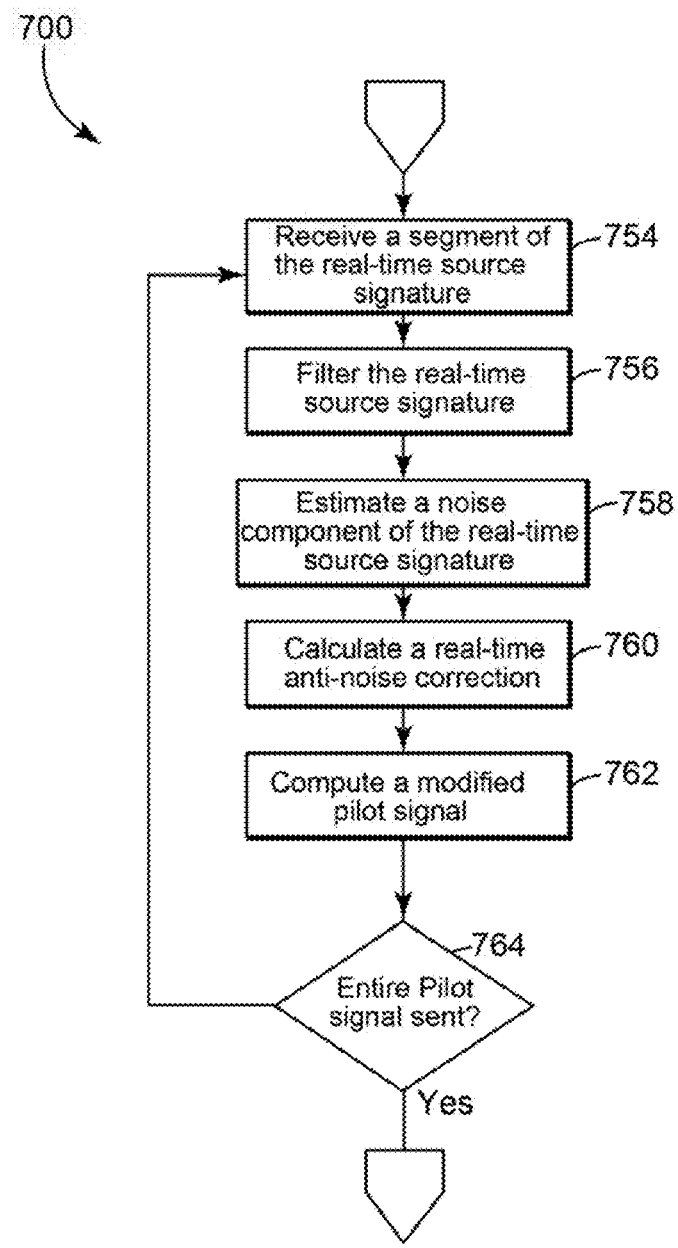

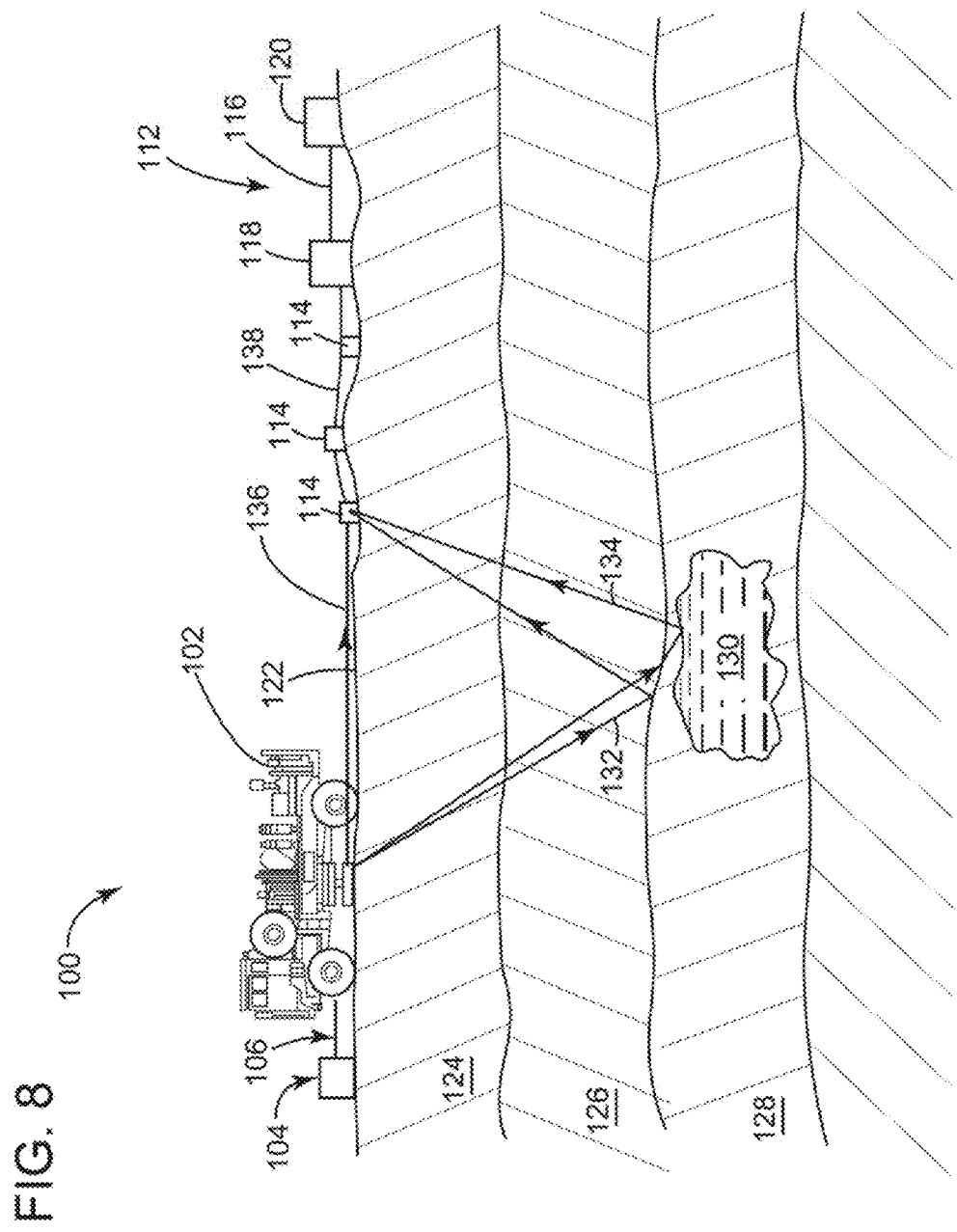

SYSTEMS AND METHODS FOR REDUCING NOISE IN A SEISMIC VIBRATORY SOURCE

TECHNICAL FIELD

The present invention relates generally to seismic exploration and, more particularly, to systems and methods for reducing noise in a seismic vibratory source.

BACKGROUND

In the oil and gas industry, seismic exploration techniques are commonly used to aid in locating subsurface deposits of hydrocarbons and other useful minerals. Seismic exploration, whether on land or at sea, is a method of detecting geologic structures below the surface of the earth by analyzing seismic energy that has interacted with the geologic structures. Generally, a seismic vibratory source imparts a force at the surface of the earth. The resulting mechanical stress propagates according to the elastic properties of the subsurface, and is at least partially reflected by subsurface seismic reflectors (interfaces between geologic structures that have different acoustic impedances). Seismic receivers, placed at or near the earth's surface, within bodies of water, or below the earth's surface in wellbores, record the ground motion or fluid pressure resulting from the reflection. The recordings are processed to generate information about the location and physical properties of the subsurface geologic structures that reflected the seismic energy.

Various types of sources have been employed to impart seismic energy into the earth, but most fall into one of two general categories: impulsive or vibratory. An impulsive source, such as an explosive or airgun, generates a short, high-amplitude force, injecting a large amount of energy into the ground in a brief time. Recordings generated using impulsive sources generally have a high signal-to-noise ratio, which facilitates subsequent processing. However, the use of impulsive sources can present safety or environmental concerns.

By contrast, a vibratory seismic vibratory source generates a lower-amplitude force over a longer period of time. The resulting recordings generally have a lower signal-to-noise ratio than those generated with impulsive sources. Furthermore, because the imparted force typically extends over a time much longer than the interval between reflections, the recorded data generally contains multiple overlapping reflections. However, subsequent processing can correlate the recorded data with the sweep reference signal to collapse the data to produce a correlated shot gather that resembles a shot gather acquired using an impulsive source.

Vibratory sources can take a number of different forms. For example, recent land surveys have often employed servo-controlled hydraulic "shaker units" mounted on trucks. Marine vibratory sources used in the recent past include a towed bell-shaped housing, with an acoustic piston in its open end driven by a hydraulic system similar to the land-based shaker units. However, alternative designs have been used, and the term "vibratory source" is intended to encompass any seismic vibrator, whether used on dry land or at sea.

Vibratory sources also permit some control over the characteristics of the imparted force. For example, to facilitate data collection, subsequent data processing, or both, it is often desirable to impart a force with energy at one or more desired frequencies, and to vary those frequencies over time. Such a controlled force is typically referred to as a "sweep." The difference between the highest and lowest frequencies contained in the sweep is known as the "frequency range" of the sweep, and the length of time over which the source generates the sweep is known as the "sweep time." Many different forms of sweep may be useful in a seismic survey. For example, a sweep may include a single sinusoid at a fundamental frequency that starts low and varies monotonically upward (an "upsweep") or a fundamental frequency that starts high and varies monotonically downward (a "downsweep"). Such sweeps may be linear, with the fundamental frequency changing at a fixed rate over the entire sweep time. Sweeps may also be nonlinear, for example a quadratic or logarithmic sweep. Alternatively, a sweep may include an unvarying fundamental frequency, a mixture of multiple frequencies, an exotic signal such as a pseudo-random sequence, or any other desired signal.

Vibratory sources are generally controlled by a sweep generator. In most cases, the sweep generator outputs a pilot signal that is the same as the sweep reference signal, which is delivered to the source controller as an input. The source controller in combination with the vibrator actuator operates as a closed-loop feedback control system. Ideally, the source would generate a duplicate of the pilot signal as the force imparted into the earth. However, for a variety of reasons, the force actually generated by a vibratory source may differ from the pilot signal and consequently may differ from the sweep reference signal that is used as the correlation operator. For example, machinery associated with the source may introduce noise—undesired energy not present in the pilot signal. Noise may also result from characteristics of the earth, such as the mechanical impedance of the ground, from variations in the location, bad coupling due to operation on uneven surfaces or orientation of the source, or from other factors. Even though the vibrator control is a closed-loop feedback system, the closed loop bandwidth of the controllers in common use today may be insufficient to mitigate this noise. To facilitate subsequent data processing, and thus ultimately to aid in the detection of subsurface geologic structures, it is desirable to reduce or eliminate noise introduced into the sweep generated by a seismic vibratory source.

SUMMARY

The present disclosure is directed generally to systems and methods for reducing noise in a seismic vibratory source.

In accordance with one or more embodiments of the present disclosure, a method for reducing noise in a seismic vibratory source is disclosed. The method includes generating an initial pilot signal for the source and receiving a source signature based on the initial pilot signal. The method also includes estimating a noise component of the source signature based on the source signature and the initial pilot signal. The method further includes generating an anti-noise correction for the initial pilot signal based on the noise component of the source signature.

In accordance with another embodiment of the present disclosure, a seismic energy emission system configured to reduce noise is disclosed. The system includes a seismic vibratory source and a computing system. The computing system is configured to generate an initial pilot signal for the source and receive a source signature based on the initial pilot signal. The computing system is also configured to estimate a noise component of the source signature based on the source signature and the initial pilot signal. The computing system is further configured to generate an anti-noise correction to the initial pilot signal based on the noise component of the source signature.

In accordance with another embodiment of the present disclosure, a non-transitory computer-readable storage medium carrying computer-executable instructions for reducing noise in a seismic vibratory source is disclosed. The instructions, when executed, cause a processor to generate an initial pilot signal for a source and receive a source signature based on the initial pilot signal. The processor is also caused to estimate a noise component of the source signature based on the source signature and the initial pilot signal. The processor is further caused to generate an anti-noise correction to the initial pilot signal based on the noise component of the source signature.

BRIEF DESCRIPTION OF THE DRAWINGS

For a more complete understanding of the present invention and its features and advantages, reference is now made to the following description, taken in conjunction with the accompanying drawings, in which:

FIG. 2A illustrates a time vs. frequency spectral density contour plot of an example pilot signal to be delivered to a particular source in accordance with some embodiments of the present disclosure;

FIG. 2B illustrates a time vs. frequency spectral density contour plot of an example force generated by a particular source in response to the pilot signal illustrated in FIG. 2A in accordance with some embodiments of the present disclosure;

FIG. 3A illustrates a time vs. frequency spectral density contour plot of an example pilot signal modified by application of a single anti-noise correction in accordance with some embodiments of the present disclosure;

FIG. 4A illustrates a time vs. frequency spectral density contour plot of an example pilot signal modified by application of multiple anti-noise corrections in accordance with some embodiments of the present disclosure;

FIG. 5 illustrates a graph of the cross-correlation between the initial example pilot signal illustrated in FIG. 2A and example forces generated by a particular source in response to unmodified pilot signals and to pilot signals modified by one or more anti-noise corrections in accordance with some embodiments of the present disclosure;

FIG. 6 illustrates a flow chart of an example method for reducing noise in a seismic vibratory source in accordance with some embodiments of the present disclosure;

FIG. 7 illustrates a flow chart of an example method for incorporating a real-time or near-real-time correction in a pilot signal in accordance with some embodiments of the present disclosure;

FIG. 8 illustrates an elevation view of an example seismic exploration system configured to use a seismic vibratory source to produce images of the earth's subsurface geological structure in accordance with some embodiments of the present disclosure.

DETAILED DESCRIPTION

In general, during a seismic survey the operator of a seismic vibratory source (or "source") desires to generate a particular force—known as a "target force"—at the location of the source. For example, the operator may desire to emit an upsweep, a downsweep, or any other desired sweep. The target force may be determined based on a particular implementation, the location of the subsurface zone of interest, its elastic response, environmental regulations in the exploration area, the characteristics of the vibratory seismic vibratory source, projected qualities of the generated force, or any other suitable characteristic.

In operation, an operator supplies a pilot signal to the source that may be a copy of the target force. For example a frequency swept sine wave whose instantaneous frequency and amplitude have attributes that produce a desired spectral amplitude energy density. A source that operated substantially free of noise would reproduce the pilot signal in the seismic force it generates. However, sources generally do not exactly duplicate their inputs or even generate pure linear transforms of them. Instead, undesired energy as noise may appear in the generated force, whether from the seismic vibratory source itself, from various imperfections in the transfer of forces to the ground, or from other noise sources. By observing the forces actually generated by a particular source and applying suitable adjustments to the pilot signal, the noise in the resulting generated force may be reduced or eliminated. Thus, the generated force may be a closer approximation of the target force desired by the operator. The systems and methods disclosed herein relate generally to calculating and applying such adjustments to the pilot signal.

Embodiments of the present invention and its advantages are best understood by referring to FIGS. 1 through 9 of the drawings, like numerals being used for like and corresponding parts of the various drawings.

Figure 1:
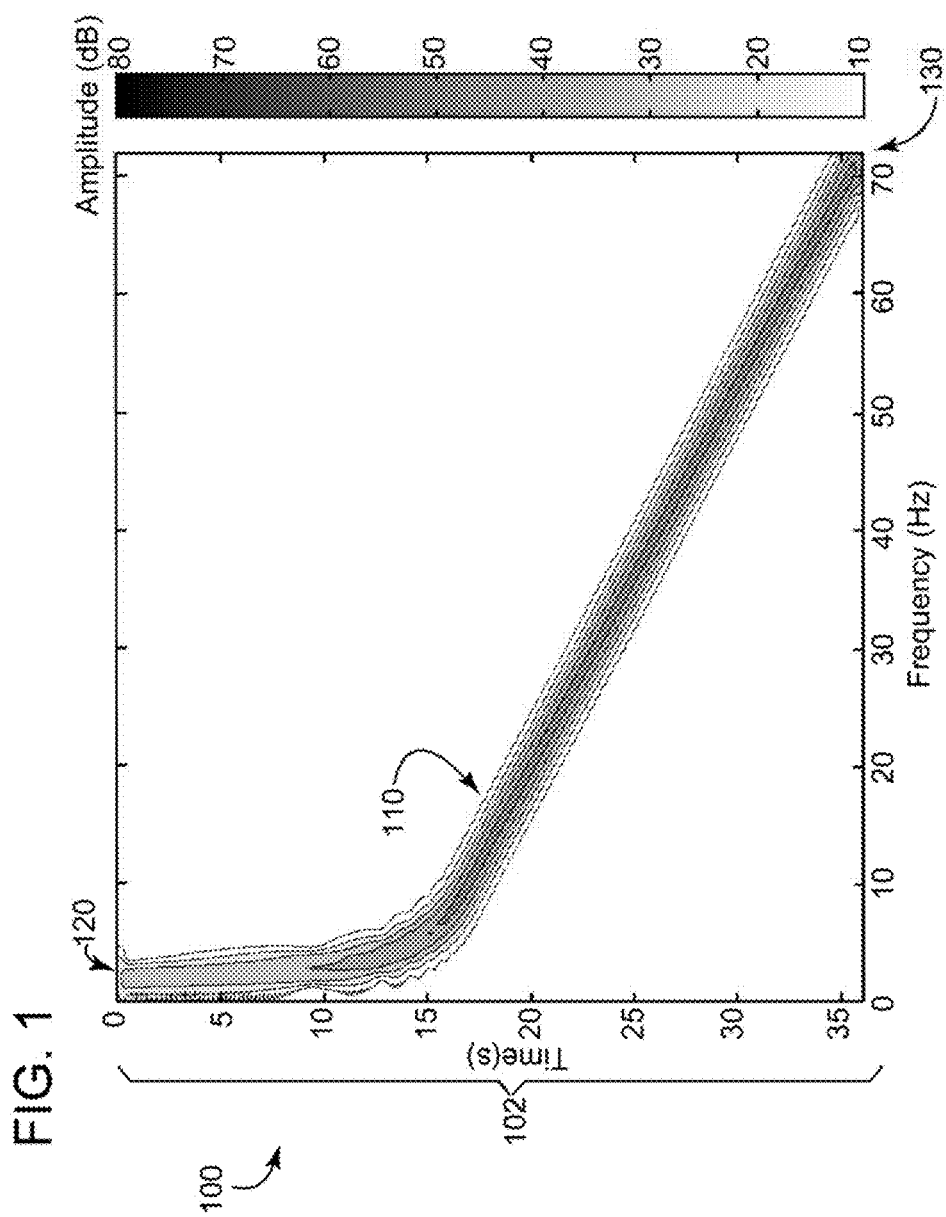
FIG. 1 illustrates a time vs. frequency spectral density contour plot of an example target force in accordance with some embodiments of the present disclosure.

FIG. 1 illustrates a time vs. frequency spectral density contour plot 100 of an example target force having a spectral density amplitude 102 in accordance with some embodiments of the present disclosure. Graph 100 represents the power spectrum amplitude of target force 102 as a function of both frequency and time, expressed in decibels (dB) relative to 1 kN/√Hz. For example, target force 102 contains nonlinear upsweep 110 that contains energy at a single fundamental frequency that increases over time. For example, upsweep 110 lasts for approximately thirty-six seconds, with start frequency 120 of approximately two hertz at time equal to approximately two seconds and end frequency 130 of approximately seventy-two hertz at time equal to approximately thirty-six seconds. In some embodiments, target force 102 may contain a single unvarying fundamental frequency, a downsweep, a mixture of multiple frequencies, or any other desired signal.

FIG. 2A illustrates a time vs. frequency spectral density contour plot 200 of an example pilot signal having a spectral density amplitude 202 to be delivered to a particular source in accordance with some embodiments of the present disclosure. In some embodiments, pilot signal 202 is a duplicate of target force 102 depicted in graph 100 (see FIG. 1). For example, pilot signal 202 contains nonlinear upsweep 210 containing energy at a single fundamental frequency that increases over time. Pilot signal 202 begins at start frequency 220 and concludes at end frequency 230. For example, pilot signal 202 lasts for approximately thirty-six seconds, with start frequency 220 of approximately two hertz at time equals approximately zero seconds and end frequency 230 of approximately seventy-two hertz at time equals approximately thirty-six seconds. Pilot signal 202 may be referred to as the "initial pilot signal."

However, the force generated by the source may not consist solely of an approximate duplicate of initial pilot signal 202. For example, machinery associated with the source may introduce energy at frequencies not included in the initial pilot signal. Undesired energy in a generated force may be referred to as "noise." A particular form of noise is a "harmonic"—energy at an integer multiple of a fundamental frequency included in the pilot signal. For example, a harmonic may include energy at a frequency twice or three times that of a fundamental frequency in initial pilot signal 202 at a particular time. Harmonics may result from characteristics of the source, a vehicle on which the source is carried, the earth's surface, the interaction of earth's surface and the source, or any other sources of harmonic energy.

FIG. 2B illustrates time vs. frequency spectral density contour plot 250 of an example force having a spectral density amplitude 252 generated by a particular source in response to pilot signal 202 illustrated in FIG. 2A in accordance with some embodiments of the present disclosure. Force 252 may be referred to as a "generated force." As intended, generated force 252 contains energy substantially within upsweep 260 that substantially corresponds to upsweep 110 in target force 102 (see FIG. 1). Upsweep 260 further substantially corresponds to upsweep 210 in initial pilot signal 202. However, generated force 252 also contains undesired energy 270 at other frequencies. For example, undesired energy 270 is present at least at harmonics of the fundamental frequency contained in upsweep 210 in pilot signal 202. Harmonics may fall within the frequency range of target force 102. For example, low-order harmonic 280 early in generated force 252 duplicates the fundamental frequency of a later portion of upsweep 260. Seismic energy at duplicate frequencies may complicate the processing needed to generate an image of the subsurface geologic structures. By contrast, harmonics may fall outside the frequency range of target force 102. For example, a high-order harmonic early in an upsweep or a low-order harmonic late in an upsweep could fall at frequencies above end frequency 130 of target force 102. Seismic energy outside the frequency range of target force 102 may be filtered out and ignored during later processing. Generated force 252 may also be referred to as the "initial generated force."

In some embodiments, noise in a force generated by a source may be reduced or eliminated so that the generated force would more closely duplicate target force 102. Therefore, in some embodiments, an anti-noise correction is applied to initial pilot signal 202. The anti-noise correction is intended to cause the source to partially or completely cancel the noise that the source generates when provided unmodified initial pilot signal 202. In some embodiments, a single anti-noise correction is applied to the initial pilot signal. However, a single anti-noise correction may only partially cancel the noise in the force. Furthermore, the source may generate additional noise in response to the anti-noise correction itself, though typically this additional noise is of smaller magnitude than the noise generated in response to the initial pilot signal. Therefore, in some embodiments, anti-noise corrections are iteratively applied to the pilot signal.

FIG. 3A illustrates time vs. frequency spectral density contour plot 300 of an example pilot signal having a spectral density amplitude 302 modified by application of a single anti-noise correction in accordance with some embodiments of the present disclosure. Graph 300 illustrates pilot signal 302, which represents initial pilot signal 202 (see FIG. 2A) modified by application of a single anti-noise correction. Modified pilot signal 302 contains energy at frequencies and times corresponding to target force 102 (see FIG. 1). For example, modified pilot signal 302 contains energy substantially within upsweep 310 that substantially corresponds to upsweep 110 in target force 102 (see FIG. 1). Upsweep 310 further substantially corresponds to upsweep 210 in initial pilot signal 202 (see FIG. 2A). As a result of the anti-noise correction, modified pilot signal 302 contains energy at other frequencies. For example, modified pilot signal 302 contains energy at harmonics 340 of upsweep 110 in target force 102.

Figure 3B:
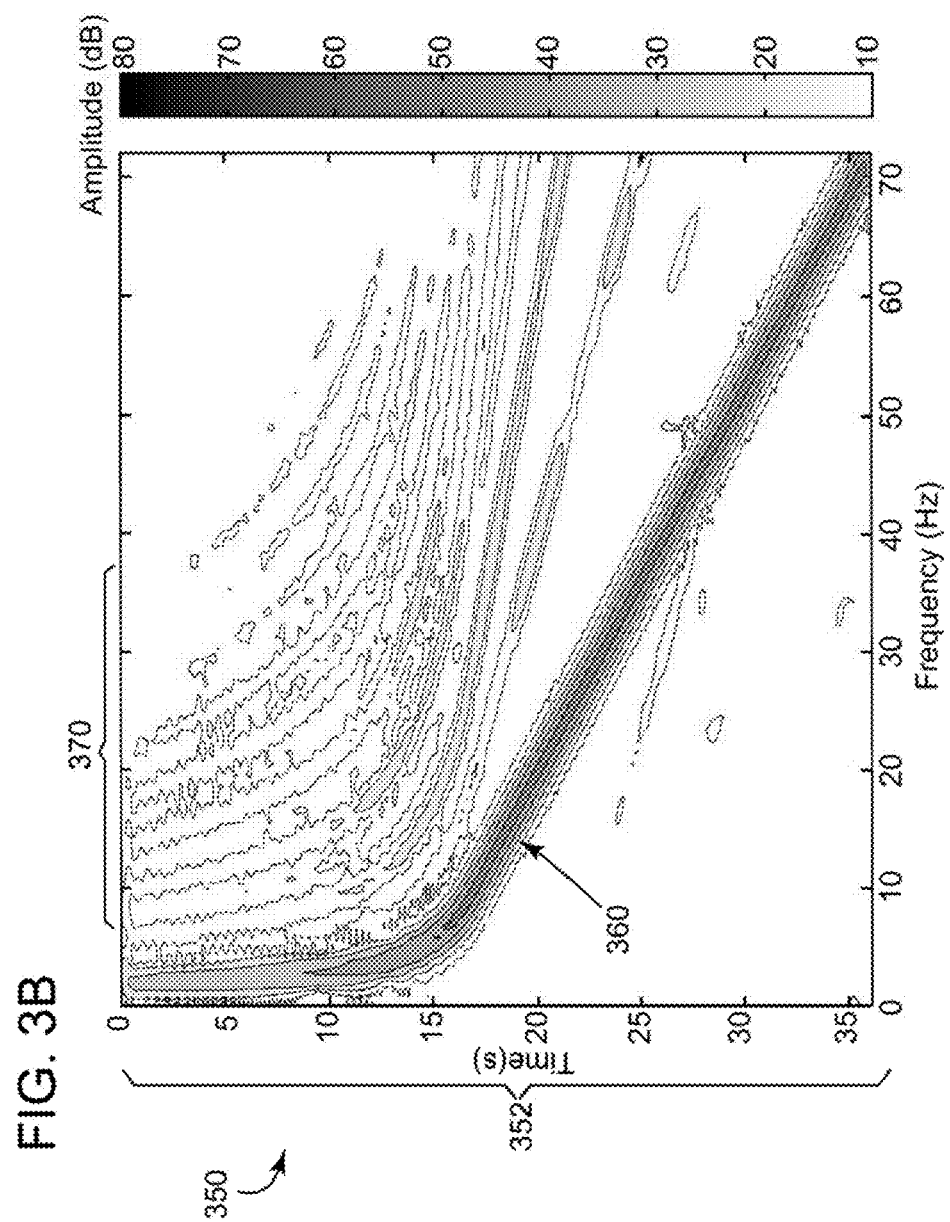
FIG. 3B illustrates a time vs. frequency spectral density contour plot of an example force generated by a particular source in response to the modified pilot signal illustrated in FIG. 3A in accordance with some embodiments of the present disclosure.

FIG. 3B illustrates time vs. frequency spectral density contour plot 350 of an example force having a spectral density amplitude 352 generated by a particular source in response to modified pilot signal 302 illustrated in FIG. 3A in accordance with some embodiments of the present disclosure. Force 352 may be referred to as a "generated force," As intended, generated force 352 contains energy substantially within upsweep 360 that substantially corresponds to upsweep 110 in target force 102 (see FIG. 1). Upsweep 360 further substantially corresponds to upsweep 210 in initial pilot signal 202 (see FIG. 2A). However, generated force 352 also contains undesired energy 370 at other frequencies. Because harmonics 340 in modified pilot signal 302 (see FIG. 3A) cause partial cancellation of undesired energy 270 in initial generated force 252 (see FIG. 2B), undesired energy 370 is lower within the frequency range of target force 102 (see FIG. 1) than undesired energy 270 in initial generated force 252. For example, the energy contained within harmonics 340 may be reduced by approximately twelve dB.

Figure 3C:
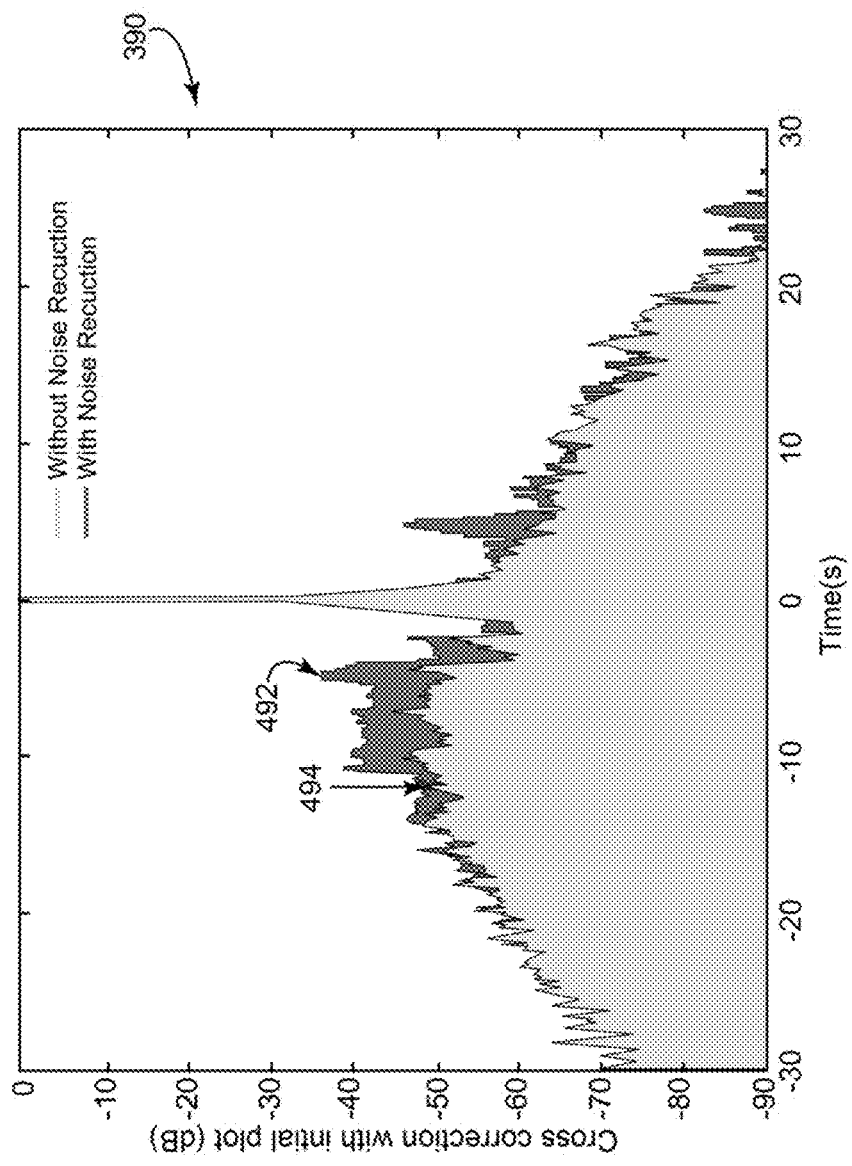
FIG. 3C illustrates a time vs. frequency spectral density graph of the example force illustrated in FIG. 3B relative to the example force illustrated in FIG. 2B in accordance with some embodiments of the present disclosure.

FIG. 3C illustrates time vs. frequency spectral density graph 390 of example force 352 illustrated in FIG. 3B relative to initial force 252 illustrated in FIG. 2B in accordance with some embodiments of the present disclosure. Trace 392 illustrates the cross-correlation (measured in dB) as a function of time between initial pilot signal 202 shown on FIG. 2A and example force 252 shown on FIG. 2B. Trace 394 illustrates the cross-correlation as a function of time between initial pilot signal 202 shown on FIG. 2A and example force 352 shown on FIG. 3B. Because harmonics 340 in modified pilot signal 302 (see FIG. 3A) cause partial cancellation of undesired energy 270 in initial generated force 252, the amplitude of trace 394 is lower than that of trace 392 at times not approximately equal to t=0. For example, the amplitude of trace 394 may be reduced by approximately twelve dB.

FIG. 4A illustrates time vs. frequency spectral density contour plot 400 of an example pilot signal having a spectral density amplitude 402 modified by application of multiple anti-noise corrections in accordance with some embodiments of the present disclosure. Graph 400 illustrates pilot signal 402, which represents pilot signal 302 (see FIG. 3A) iteratively modified by application of multiple anti-noise corrections. As above, modified pilot signal 402 contains energy at frequencies and times corresponding to target force 102 (see FIG. 1). For example, modified pilot signal 402 contains energy substantially within upsweep 410 that substantially corresponds to upsweep 110 in target force 102 (see FIG. 1). Upsweep 410 further substantially corresponds to upsweep 210 in initial pilot signal 202 (see FIG. 2A). As a result of the anti-noise corrections, pilot signal 402 also contains energy at other frequencies. For example, modified pilot signal 402 contains energy at harmonics 440 of upsweep 110 in target force 102. The application of multiple anti-noise corrections may increase or decrease the amplitudes of harmonics 440 in a pilot signal. Modified pilot signal 402 may be referred to as a "final pilot signal."

Figure 4B:
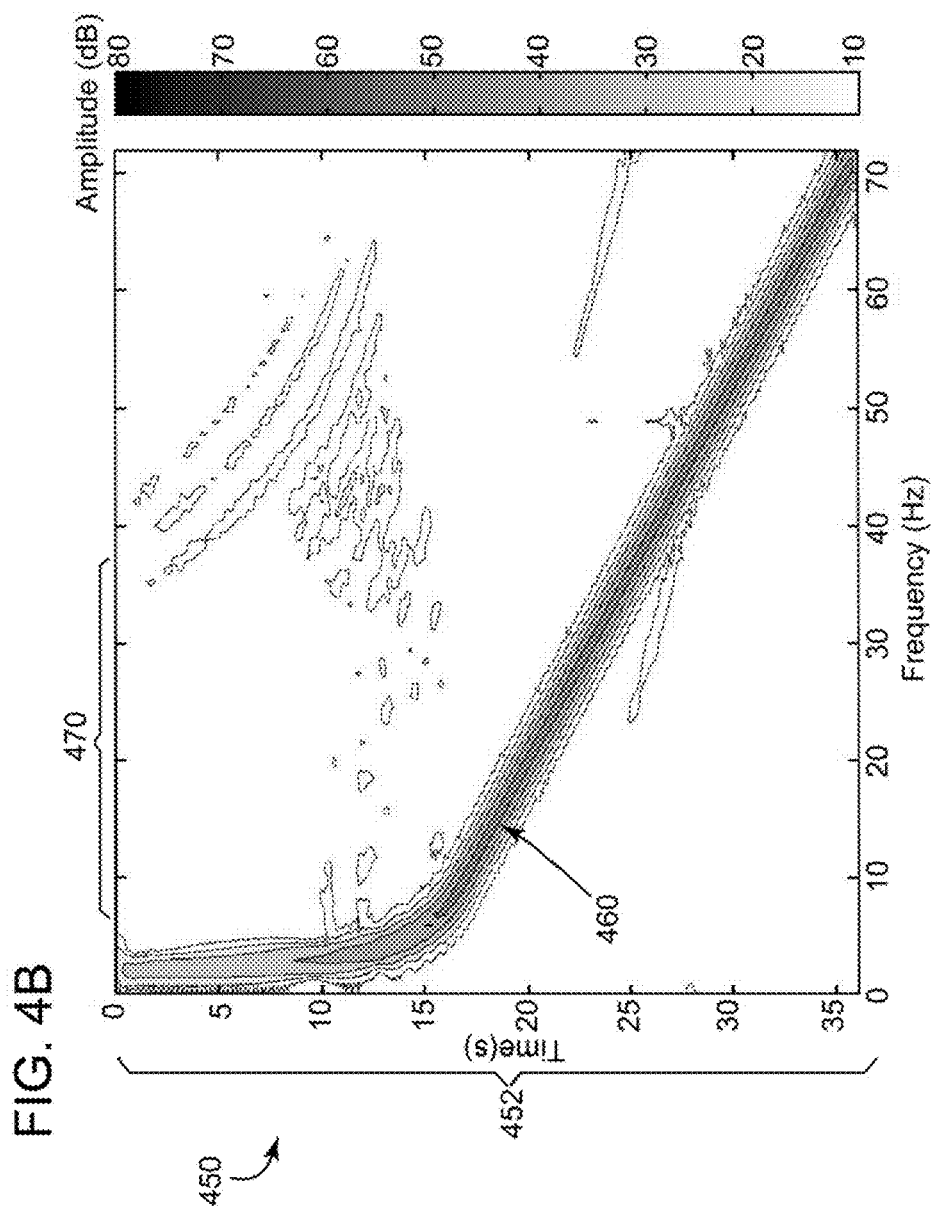
FIG. 4B illustrates a time vs. frequency spectral density contour plot of an example force generated by a particular source in response to the modified pilot signal illustrated in FIG. 4A in accordance with some embodiments of the present disclosure.

FIG. 4B illustrates time vs. frequency spectral density contour plot 450 of an example force having a spectral density amplitude 452 generated by a particular source in response to modified pilot signal 402 illustrated in FIG. 4A in accordance with some embodiments of the present disclosure. Force 452 may be referred to as a "generated force." As intended, generated force 452 contains energy substantially within upsweep 460 that substantially corresponds to upsweep 110 in target force 102 (see FIG. 1). Upsweep 460 further substantially corresponds to upsweep 210 in initial pilot signal 202 (see FIG. 2). However, generated force 452 also contains undesired energy 470 at other frequencies. Because the harmonics 440 in final pilot signal 402 cause partial cancellation of the undesired energy 270 in initial generated force 252, the undesired energy 470 is lower within the frequency range of target force 102 than the undesired energy 270 in initial generated force 252. Furthermore, undesired energy 470 is typically lower than undesired energy 370 in generated force 352 (see FIG. 3) because the application of multiple anti-noise corrections tends to reduce the noise contained in the generated force. For example, the energy contained within harmonics 440 may be reduced by approximately twenty dB. Undesired energy may remain at frequencies outside the frequency range of target force 102. However, seismic energy outside the frequency range of target force 102 may be filtered out and ignored during later processing.

Figure 4C:
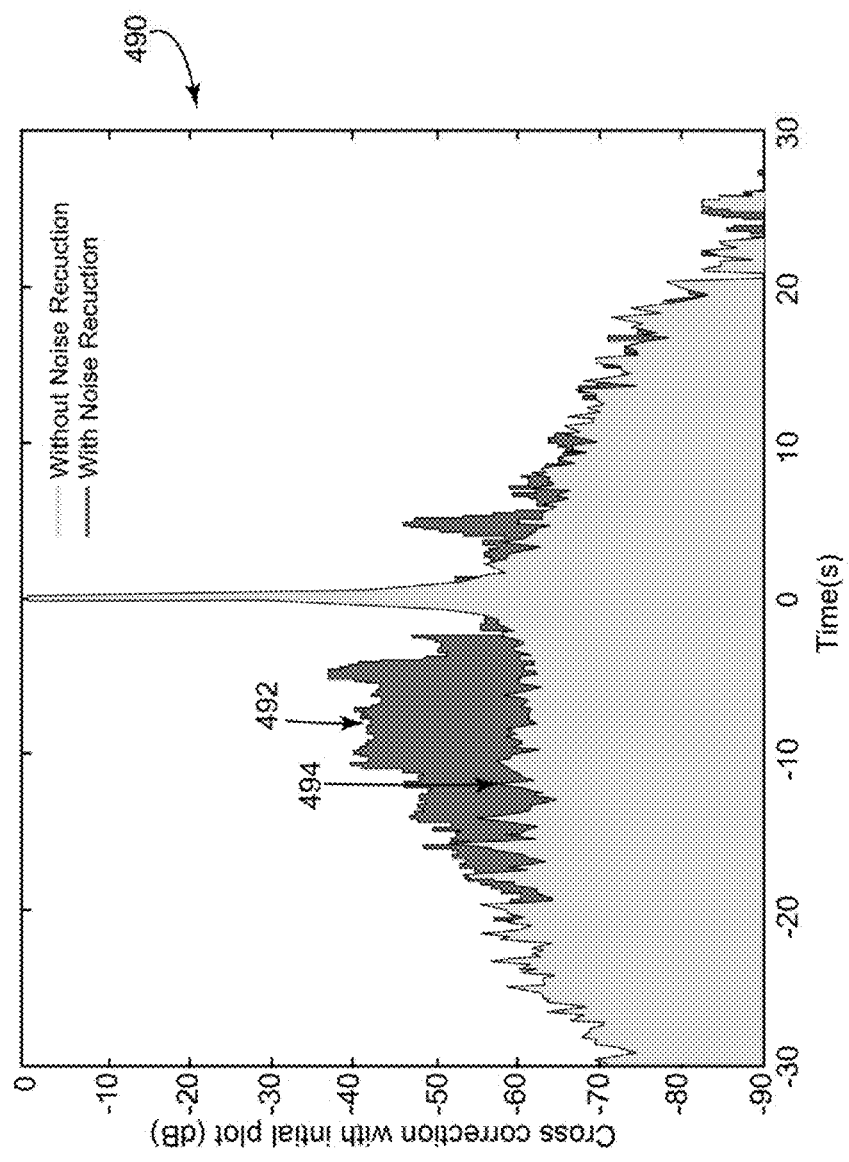
FIG. 4C illustrates a time vs. frequency spectral density graph of the example force illustrated in FIG. 4B relative to the example force illustrated in FIG. 2B in accordance with some embodiments of the present disclosure.

FIG. 4C illustrates time vs. frequency spectral density graph 490 of example force 452 illustrated in FIG. 4B relative to example force 252 illustrated in FIG. 2B in accordance with some embodiments of the present disclosure. Trace 492 illustrates the cross-correlation between initial pilot signal 202 shown on FIG. 2A and example force 252 shown on FIG. 2B (measured in dB) as a function of time. Trace 494 illustrates the cross-correlation between initial pilot signal 202 shown on FIG. 2A and example force 352 shown on FIG. 3B as a function of time. Because harmonics 340 in modified pilot signal 302 (see FIG. 3A) cause partial cancellation of undesired energy 270 in initial generated force 252, the amplitude of trace 394 is lower than that of trace 392 at times not approximately equal to t=0. For example, the amplitude of the cross-correlation may be reduced by approximately twenty dB.

FIG. 5 illustrates a graph 500 of the cross-correlation between initial pilot signal 202 shown on FIG. 2A and example forces generated by a source in response to unmodified pilot signals and to pilot signals modified by one or more anti-noise corrections in accordance with some embodiments of the present disclosure. In graph 500, the cross-correlation of each iteration of applying the anti-noise correction is plotted as a function of time. For example, the first iteration depicts the cross-correlation of initial pilot signal 202 illustrated in FIG. 2A with initial generated force 252 illustrated in FIG. 2B. The cross-correlation reaches a peak magnitude 510 at time equal to approximately zero seconds. However, graph 500 also contains magnitudes 520 at other times. After several iterations of applying an anti-noise correction, the magnitude of the cross-correlation is significantly reduced at all times other than the peak 510 at time equal to approximately zero seconds. For example, iteration number nineteen includes substantially no high magnitudes other than peak magnitude 510 at time equal to approximately zero seconds. The convergence of cross-correlations on peak magnitude 510 indicates that the generated force closely approximates target force 102 at iteration number nineteen. Because the cross-correlation illustrated here is exemplary only, a cross-correlation graph of a particular source using pilot signals modified by a particular embodiment of the present disclosure may converge after fewer iterations, after more iterations, or not at all.

FIG. 6 illustrates a flow chart of an example method 600 for reducing noise in a seismic vibratory source in accordance with some embodiments of the present disclosure. A source designed to reduce noise may be operable to reduce noise within a desired range of frequencies, for example the frequency range of target force 102. Furthermore, the source may increase noise outside the desired range of frequencies. The steps of method 600 can be performed by a user, electronic or optical circuits, various computer programs, models, or any combination thereof, configured to generate pilot signals or design seismic sweeps. The programs and models may include instructions stored on a non-transitory computer-readable medium and operable to perform, when executed, one or more of the steps described below. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer readable media. Collectively, the user, circuits, or computer programs and models used to generate pilot signals or design seismic sweeps may be referred to as a "sweep design tool." For illustrative purposes, method 600 is described with respect to target force 102 (see FIG. 1); however, method 600 may be used to reduce noise in any suitable sweep generated by a seismic source.

In the following description, some mathematical terms are given a subscript k to indicate that those quantities are related to the k-th iteration of method 600. For example, the source signature received in step 610 below is labeled $S_k(t)$ to indicate that it was received in the k-th iteration (and that the value of $S_k$ is a function of time t). Thus, $S_0(t)$ represents force 252 generated by the source in response to initial pilot signal 202 (with zero corrections applied), $S_1(t)$ represents force 352 generated in response to pilot signal 302 (with a single correction applied), and so on. The iteration counter allows the sweep design tool to index and refer to pilot signals, anti-noise corrections, generated forces, and intermediate results determined at any stage of method 600.

In step 602, the sweep design tool determines a target force. The target force may be determined based on a particular implementation, the location of the subsurface zone of interest, its elastic response, environmental regulations in the exploration area, the characteristics of the vibratory seismic vibratory source, projected qualities of the generated force, or any other suitable characteristic. For example, in FIG. 1, target force 102 includes nonlinear upsweep 110 with start frequency 120 of approximately two hertz at time equal to approximately zero seconds and end frequency 130 of approximately seventy-two hertz at time equal to approximately thirty-six seconds. The target force is labeled $F^{target}(t)$.

In step 604, the sweep design tool generates a pilot signal. In some embodiments, the pilot signal is an initial pilot signal that substantially corresponds to the target force. For example, in FIG. 2A, initial pilot signal 202 includes nonlinear upsweep 210 that corresponds to upsweep 110 in target force 102. In some embodiments, the pilot signal contains energy not corresponding to the target force. For example, in FIG. 3A, pilot signal 302 includes upsweep 310 that corresponds to upsweep 110 in target force 102, as well as harmonics 340 of upsweep 310. The initial pilot signal is labeled $P_0(t)$. The initial pilot signal can also be used as the reference signal for later correlations.

In step 606, the sweep design tool initializes an iteration counter. For example, it may set a counter k to 0, in which case k will be equal to the number of anti-noise corrections that have already been applied by method 600.

In step 608, the sweep design tool outputs the pilot signal to a seismic vibratory source. For example, initial pilot signal 202 is output to the source, for example a vibroseis truck, and the source then generates a force based on pilot signal 202. The pilot signal output at this step is labeled $P_k(t)$.

In step 610, the sweep design tool receives a source signature. In response to the pilot signal output in step 608, the source generates a force which is transmitted to the surface of the earth. The force or a close analogue from which the force may be estimated is detected and recorded at or near the source by a suitable measurement device. In some embodiments, the source incorporates sensors that measure the motions of one or more actuating parts of the source. In some embodiments, these measured motions are combined using a weighted average, with the motion of each actuating part weighted by the mass of the corresponding actuating part. In some embodiments, a near-field measuring device is used to measure a velocity signal. In such embodiments, the velocity signal represents the convolution of the force and a filter function based on the near-field measuring device, and the force may be derived by deconvolving the velocity signal with the filter function. However it is determined, the resulting measurement or estimate of the generated force may be referred to as a "source signature." The sweep design tool receives the source signature so determined. For example, in some embodiments, the sweep design tool receives generated force 252 (based on initial pilot signal 202). As described above, the source signature received at step 610 is labeled $S_k(t)$.

In step 612, the sweep design tool filters the source signature. For example, the sweep design tool may perform time-amplitude compression or any other suitable filter.

In step 614, the sweep design tool estimates a noise component of the source signature. For example, in some embodiments the source signature $S_k(t)$ is modeled as a sum of the target force $F^{target}(t)$ and a noise component $N_k(t)$ according to the following equation:

$$S_k(t)=F^{target}(t)+N_k(t) \quad (1)$$

This permits the noise component to be calculated by taking the difference of the source signature $S_k(t)$ and the target force $F_{target}(t)$ according to the following equation:

$$N_k(t)=S_k(t)-F^{target}(t) \quad (2)$$

In step 616, the sweep design tool calculates an anti-noise correction. In some embodiments, the calculation includes several operations. The sweep design tool models the noise component $N_k(t)$ as the convolution of a noise operator $\Omega_{k+1}(t)$ and the target force $F^{target}(t)$ according to the following equation:

$$N_k(t)=\Omega_{k+1}(t)*F_{target}(t) \quad (3)$$

The sweep design tool calculates the noise operator $\Omega_{k+1}(t)$ by deconvolving the noise component $N_k(t)$ by the target force $F^{target}(t)$ using techniques familiar to those of ordinary skill in the art. The sweep design tool may apply adaptive shaping—for example, a bandpass filter or a noise amplitude threshold—to the noise operator. An anti-noise correction $P_{k+1}^{corr}(t)$ to the pilot signal is computed by convolving the initial pilot signal $P_o(t)$ with the noise operator $\Omega_{k+1}(t)$ according to the following equation:

$$P_{k+1}^{corr}(t)=\Omega_{k+1}(t)*P_o(t) \quad (4)$$

In step 618, the sweep design tool computes a modified pilot signal In some embodiments, the modified pilot signal $P_{k+1}(t)$ is computed by subtracting a scalable fraction $\alpha$ ($0 \leq \alpha \leq 1$) of the anti-noise correction $P_{k+1}^{corr}(t)$ calculated in step 616, according to the following equation:

$$P_{k+1}(t)=P_k(t)-\alpha P_{k+1}^{corr}(t); (0 \leq \alpha \leq 1)(t) \quad (5)$$

In step 620, the sweep design tool increments the iteration counter. In some embodiments, the sweep design tool adds 1 to the counter k to signify that a new iteration is beginning. Furthermore, once the counter is incremented, the pilot signal $P_k(t)$ used in the next iteration refers to the modified pilot signal computed in step 618. The sweep design tool returns to step 608 to send the modified pilot signal calculated in step 618 to the source and continue the method.

Modifications, additions, or omissions may be made to method 600 without departing from the scope of the present disclosure. For example, the steps may be performed in a different order than that described and some steps may be performed at the same time. Additionally, each individual step may include additional steps without departing from the scope of the present disclosure. Further, more steps may be added or steps may be removed without departing from the scope of the disclosure.

For example, in some embodiments, the source design tool has access to real-time or near-real-time measurements of the force generated by the seismic source, and can incorporate additional corrections in the pilot signal as it is output to the source. In such embodiments, step 608 may additionally include a real-time or near-real-time processing loop that adjusts the pilot signal as it is output to the source.

FIG. 7 illustrates a flow chart of an example method 700 for incorporating a real-time or near-real-time correction in a pilot signal in accordance with some embodiments of the present disclosure. The steps of method 700 can be performed by a user, electronic or optical circuits, various computer programs, models, or any combination thereof, configured to generate pilot signals or design seismic sweeps. The programs and models may include instructions stored on a non-transitory computer-readable medium and operable to perform, when executed, one or more of the steps described below. The computer readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer readable media. Collectively, the user, circuits, or computer programs and models used to generate pilot signals or design seismic sweeps may be referred to as a "sweep design tool." Furthermore, the steps of method 700 may be performed in conjunction with method 600 or may be performed separately. The sweep design tool performing the steps of method 700 may be the same sweep design tool performing the steps of method 600, or a different sweep design tool. For illustrative purposes, method 700 is described with respect to target force 102 (see FIG. 1); however, method 700 may be used to reduce noise in any suitable sweep generated by a seismic source.

Because method 700 discloses a processing loop that may be used in conjunction with method 600, it is once again useful to use a subscript to indicate quantities related to a particular iteration of the loop. Therefore, a subscript j is used in the description below to index quantities used in the j-th iteration of method 700. A quantity with both j and k subscripts refers to the quantity used in the j-th iteration of method 700 occurring during the k-th iteration of method 600.

In step 754, the sweep design tool receives a segment of the real-time source signature. In some iterations, the segment is all of the source signature that has been generated up to the time t at which step 754 is performed. In some embodiments, the segment is any portion of the source signature. For example, in the first iteration of method 700, the segment is a portion of the beginning of source signature $S_k(t)$ received in step 610. In later iterations of method 700, the segment is a portion in the middle or at the end of the source signature. Furthermore, in some embodiments, the sweep design tool aggregates the segment received at this step with the segments received during earlier iterations of method 700. The portion of the source signature the sweep design tool selects for further processing, whether a single segment or an aggregate, is labelled $S_{k,j}(t)$ and may be referred to as the "real-time source signature."

In step 756, the sweep design tool filters the real-time source signature. For example, the sweep design tool may perform time-amplitude compression.

In step 758, the sweep design tool estimates a noise component of the real-time source signature. In some embodiments, this estimation mirrors the calculations in step 614 of method 600. For example, the real-time source signature $S_{k,j}(t)$ is modeled as a sum of the corresponding portion of the target force $F_j^{target}(t)$ and a real-time noise component $N_{k,j}(t)$ according to the following equation:

$$S_{k,j}(t) = F_j^{target}(t) + N_{k,j}(t) \quad (6)$$

This permits the real-time noise component to be calculated by taking the difference of the source signature $S_{k,j}(t)$ and the corresponding portion of the target force $F_j^{target}(t)$ according to the following equation:

$$N_{k,j}(t) = S_{k,j}(t) - F_j^{target}(t) \quad (7)$$

In step 760, the sweep design tool calculates a real-time anti-noise correction. In some embodiments, this estimation mirrors the calculations in step 616 of method 600. The calculation again includes several operations. The sweep design tool models the real-time noise component $N_{k,j}(t)$ as the convolution of a noise operator $\Omega_{k,j+1}(t)$ and the corresponding portion of the target force $F_j^{target}(t)$ according to the following equation:

$$N_{k,j}(t) = \Omega_{k,j+1} * F_j^{target}(t) \quad (8)$$

The sweep design tool calculates the noise operator $\Omega_{k,j+1}(t)$ by deconvolving the real-time noise component $N_{k,j}(t)$ by the portion of the target force $F_j^{target}(t)$ using techniques familiar to those of ordinary skill in the art. The sweep design tool may apply adaptive shaping—for example, a bandpass filter or a noise amplitude threshold—to the noise operator. A real-time anti-noise correction $P_{k,j+1}^{rt}(t)$ to the pilot signal is computed by convolving the initial pilot signal $P_o(t)$ with the noise operator $\Omega_{k,j+1}(t)$ according to the following equation:

$$P_{k,j+1}^{rt}(t) = \Omega_{k,j+1}(t) * P_o(t) \quad (9)$$

In some embodiments, only a portion of the pilot signal $P_{k,j}(t)$ is used, resulting in a real-time anti-noise correction calculated according to the following equation:

$$P_{k,j+1}^{rt}(t) = \Omega_{k,j+1}(t) * P_{k,j}(t) \quad (9')$$

In step 762, the sweep design tool computes a modified pilot signal. In some embodiments, the modified pilot signal $P_{k,j+1}(t)$ is computed by subtracting a scalable fraction $\beta$ ($0 \leq \beta \leq 1$) of the anti-noise correction $P_{k,j+1}^{rt}(t)$ calculated in step 760, according to the following equation:

$$P_{k,j+1}(t) = P_k(t) - \beta P_{k,j+1}^{rt}(t); (0 \leq \beta \leq 1) \quad (10)$$

Note that, in some embodiments in which method 600 is also employed, this step results in a modified pilot signal $P_{k,j+1}(t)$ computed by subtracting a scalable fraction of the modeled noise from the prior iteration of method 600 and a scalable fraction of the modeled noise from the current iteration of method 600 according to the following equation:

$$P_{k,j+1}(t) = P_{k-1}(t) - \alpha P_k^{corr}(t) - \beta P_{k,j+1}^{rt}(t - \Delta t_{k,j+1}); (0 \leq \alpha, \beta \leq 1) \quad (11)$$

wherein $\Delta t_{k,j+1}$ is the time required to perform the calculations in steps 756 through 762.

In step 764, the sweep design tool checks whether the entire pilot signal has been sent to the source. If it has not, the sweep design tool returns to step 754 to continue with another iteration of the method. If the entire pilot signal has been sent, though, method 700 ends.

Modifications, additions, or omissions may be made to method 700 without departing from the scope of the present disclosure. For example, the steps may be performed in a different order than that described and some steps may be performed at the same time. Additionally, each individual step may include additional steps without departing from the scope of the present disclosure. Further, more steps may be added or steps may be removed without departing from the scope of the disclosure.

In general, the seismic energy generated by a source using the techniques described above is used as part of a seismic survey to discover information about subsurface structures.

FIG. 8 illustrates an elevation view of an example seismic exploration system 800 configured to use a seismic vibratory source to produce images of the earth's subsurface geological structure in accordance with some embodiments of the present disclosure. The images produced by system 800 allow for the evaluation of subsurface geology. Seismic data is acquired and processed to produce images of subsurface formations. System 800 includes one or more seismic vibratory sources 802 and one or more receivers 814 which are located within a pre-determined area selected for seismic survey or exploration. Survey of the exploration area includes the activation of seismic vibratory source 802 that applies a force which in turn generates elastic waves that propagate through the earth. The seismic energy is then partially reflected, refracted, diffracted, and otherwise returned by one or more subsurface formations such as rock layers beneath the earth's surface, producing a motion recorded by receivers 814.

System 800 includes one or more seismic vibratory sources 802. In some embodiments, source 802 is located on or proximate to surface 822 of the earth within an exploration area. A particular source 802 may be spaced apart from other adjacent sources 802. Further, a positioning system, such as a global positioning system (GPS), may be utilized to locate sources 802 and receivers 814 and time-stamp their recordings.

Source 802 is any type of seismic device that generates controlled seismic energy used to perform reflection or refraction seismic surveys, such as a land-based or marine seismic vibrator, a thumper truck, or any other suitable seismic vibratory source. For example, source 802 may be a seismic vibrator in the form of a vibroseis truck with a vertical actuator to produce compression wave energy or configured with a horizontal actuator to generate shear waves.

In some embodiments, controller unit 804 directs the operation of source 802 by transmitting a pilot signal to source 802 via network 806. For example, controller unit 804 may transmit final pilot signal 402, pilot signal 302, or initial pilot signal 202 to source 802. Although discussed separately, source 802 and controller unit 804 may be configured as separate units or as a single unit. Controller unit 804 may include any instrumentality or aggregation of instrumentalities operable to compute, classify, process, transmit, receive, store, display, record, or utilize any form of information, intelligence, or data. For example, controller unit 804 may include one or more personal computers, storage devices, servers, or any other suitable device and may vary in size, shape, performance, functionality, and price. Controller unit 804 may include random access memory (RAM), one or more processing resources, such as a central processing unit (CPU) or hardware or software control logic, or other types of volatile or non-volatile memory. Additional components of controller unit 804 may include one or more disk drives, one or more network ports for communicating with external devices, one or more input/output (I/O) devices, such as a keyboard, a mouse, or a video display. Controller unit 804 may be configured to permit communication over any type of network 106, such as a wireless network, a local area network (LAN), or a wide area network (WAN) such as the Internet. Furthermore, controller unit 804 may be located in a station truck or any other suitable enclosure, or mounted on the same vehicle as that carrying source 802. In some embodiments, controller unit 804 is a central controller that coordinates the operation of multiple sources 802.

In response to the pilot signal, source 802 radiates seismic energy into surface 822 and subsurface formations during a defined interval of time. The seismic energy may comprise any suitable type of sweep, and may or may not contain undesired noise energy. For example, in some embodiments source 802 radiates generated force 452 in response to pilot signal 402.

In some embodiments, the force generated by source 802 is detected and recorded at or proximate to source 802 by monitoring device 812, receiver 814, by measurement devices incorporated into source 802 itself, or by any other suitable system. For example, the force may be derived from a near-field measurement device or measured by combining one or more measured motions of one or more actuating parts of the source, as discussed above.

Seismic exploration system 800 includes one or more monitoring devices 112 that operate to record reflected seismic energy 832, 834, and 836. In some embodiments, monitoring device 812 includes one or more receivers 814, network 816, recording unit 818, and processing unit 820. Monitoring device 812 may be located remotely from source 802.

In some embodiments, receiver 814 is located on or proximate to surface 822 of the earth within an exploration area. Receiver 814 is any type of instrument that is operable to transform seismic energy or vibrations into a voltage signal. Receiver 814 detects movements from elastic waves or other seismic energy below surface 822 and converts the motions into electrical energy, such as electric voltages. For example, receiver 814 may be a geophone configured to detect and record seismic energy reflected from subsurface formations. Receiver 814 may be a vertical, horizontal, or multicomponent geophone. For example, receiver 814 may include a three component (3C) geophone, a 3C accelerometer, or a 3C Digital Sensor Unit (DSU). In some embodiments, multiple receivers 814 are utilized within an exploration area to provide data related to multiple locations and distances from sources 802. For example, system 800 may utilize two hundred receivers (or geophones) 814. Receivers 814 may be positioned in multiple configurations, such as linear, grid, array, or any other suitable configuration. In some embodiments, receivers 814 are positioned along one or more strings 838. Each receiver 814 is typically spaced apart from adjacent receivers 814 in the string 838. Spacing between receivers 814 in string 838 may be approximately the same preselected distance, or span, or the spacing may vary depending on a particular application, exploration area topology, or any other suitable parameter. For example, spacing between receivers 814 may be approximately ten meters.

In some embodiments, one or more receivers 814 transmit raw seismic data from reflected seismic energy via network 816 to recording unit 818. Recording unit 818 transmits raw seismic data to processing unit 820 via network 816. Processing unit 820 performs seismic data processing on the raw seismic data to prepare the data for interpretation. Although discussed separately, recording unit 818, processing unit 820, and controller unit 804 may be configured as separate units or as a single unit.

Network 816 communicatively couples one or more components of monitoring device 812 with any other component of monitoring device 812. For example, network 816 communicatively couples receivers 814 with recording unit 818 and processing unit 820. Furthermore, network 838 communicatively couples a particular receiver 814 with other receivers 814. Although discussed separately, network 816, network 838, and network 806 may be configured as separate networks or as a single network. Network 816, network 838, and network 806 may be any type of network that provides communication. For example, network 816 may include one or more of a wireless network, a local area network (LAN), or a wide area network (WAN), such as the Internet.

In some embodiments, sources 802 are controlled to generate energy and receivers 814 record seismic energy traveling along paths 832 and 834 and reflected by interfaces between subsurface layers 824, 826, and 828, oil and gas reservoirs, such as target reservoir 830, or other subsurface formations. Subsurface layers 824, 826, and 828 may have various densities, thicknesses, or other characteristics. Target reservoir 830 may be separated from surface 822 by multiple layers 824, 826, and 828. Because the embodiment depicted in FIG. 8 is exemplary only, there may be more or fewer layers 824, 826, or 828 or target reservoirs 830.

The seismic survey may be repeated at various time intervals to determine changes in target reservoir 830. The time intervals may be months or years apart. Data may be collected and organized based on offset distances, such as the distance between a particular source 802 and a particular receiver 814 and the amount of time it takes for seismic energy traveling along paths 832 and 834 from a source 804 to a particular receiver 814. The amount of time seismic energy takes to reach a receiver is known as the travel time. Data collected during a survey by receivers 814 is reflected in traces that may be gathered, processed, and utilized to generate a model of the subsurface formations.

Although discussed with reference to a land implementation, embodiments of the present disclosure are also useful in marine applications. In a marine application, monitoring device 812 may include hydrophones contained inside buoyant streamers, which may be towed behind a vessel. Seismic vibratory source 802 and monitoring device 812 may be towed behind the same or a different vessel.

Figure 9:
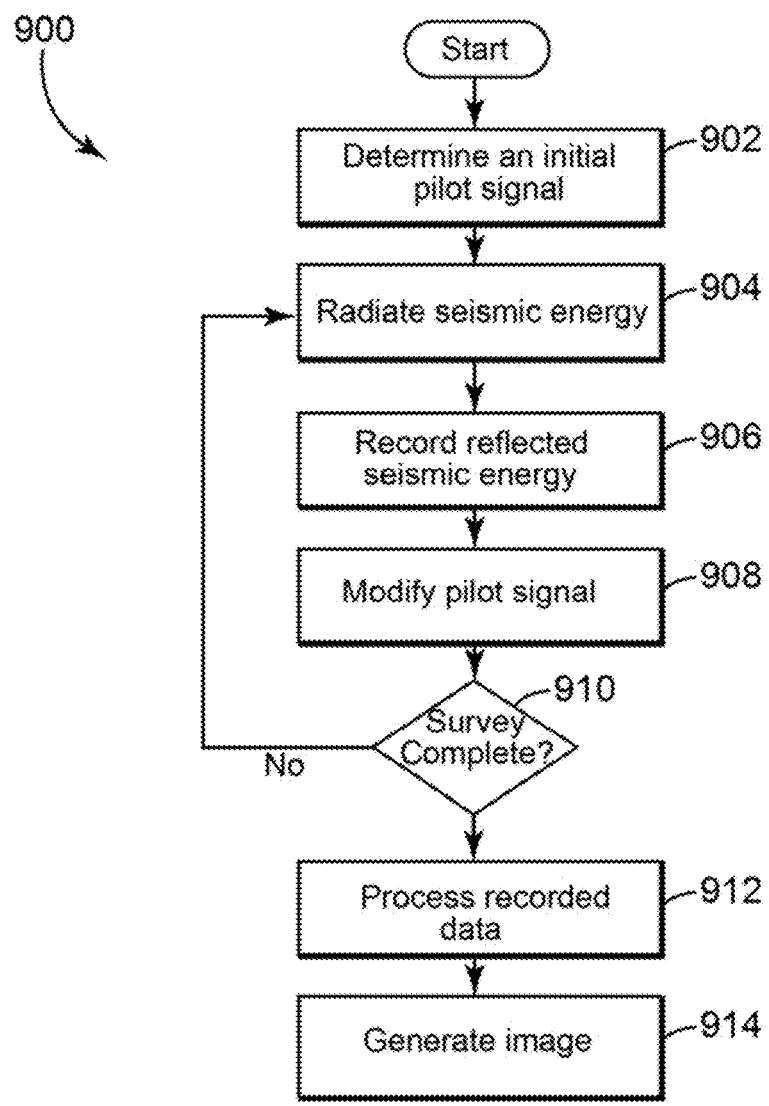
FIG. 9 illustrates a flow chart of an example method for using a seismic vibratory source in a seismic exploration system in accordance with some embodiments of the present disclosure.

FIG. 9 illustrates a flow chart of an example method for using a seismic vibratory source in a seismic exploration system in accordance with some embodiments of the present disclosure. The steps of method 900 can be performed by a user, electronic or optical circuits, various computer programs, models, a seismic exploration system such as that discussed in conjunction with FIG. 8, or any combination thereof. The programs and models may include instructions stored on a non-transitory computer-readable medium and operable to perform, when executed, one or more of the steps described below. The computer readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer readable media. Collectively, the user, circuits, computer programs and models, or seismic exploration system may be referred to as a "survey system."

In step 902, the survey system determines an initial pilot signal. In some embodiments, the initial pilot signal is initial pilot signal 202, shown with reference to FIG. 1. However, any suitable sweep may be used.

In step 904, the survey system radiates seismic energy. For example, in some embodiments, source 802 radiates generated force 252 in response to initial pilot signal 202, shown with reference to FIG. 2. In later iterations, source 802 may radiate generated force 352 (in response to pilot signal 302 shown in FIG. 3A), generated force 452 (in response to pilot signal 402 shown in FIG. 4A), or any other suitable sweep. In some embodiments, the survey system may apply corrections to the pilot signal in real time or near real time, for example by using method 700.

In step 906, the survey system records reflected seismic energy. For example, in some embodiments, receiver 814 detects seismic energy and converts it to data which is transmitted to recording unit 818 via network 816, shown with reference to FIG. 8.

In step 908, the survey system modifies the pilot signal. For example, in some embodiments the survey system uses method 600 shown in FIG. 6 to calculate a modified pilot signal.

In step 910, the survey system determines whether the survey is complete. If it is not, the survey system returns to step 904 to radiate another sweep based on the modified pilot signal. If the survey is complete, the survey system continues to step 912.

In step 912, the survey system processes the recorded data. For example, in some embodiments, processing unit 820 correlates data from one or more recording units 818 to generate information about subsurface formations.

In step 914, the survey system generates an image of one or more subsurface formations. For example, the survey system may display a 2-D or 3-D image of the subsurface formations detected in step 912 on a computer monitor using visualization techniques familiar to those of ordinary skill in the art. Users of the system may examine or manipulate such images in order to locate subsurface deposits of oil, gas, or other valuable minerals.

Modifications, additions, or omissions may be made to method 900 without departing from the scope of the present disclosure. For example, the steps may be performed in a different order than that described and some steps may be performed at the same time. Additionally, each individual step may include additional steps without departing from the scope of the present disclosure. Further, more steps may be added or steps may be removed without departing from the scope of the disclosure.

Finally, although the present disclosure and its advantages have been described in detail, it should be understood that various changes, substitutions and alterations can be made herein without departing from the spirit and that the scope of the disclosure is solely defined by the following claims.

What is claimed is:

1. A method for reducing noise in a seismic vibratory source, comprising:
   generating an initial pilot signal $P_k(t)$ for the seismic vibratory source;
   receiving a source signature $S_k(t)$ corresponding to the initial pilot signal $P_k(t)$;
   estimating a noise component $N_k(t)$ of the source signature $S_k(t)$ based on the source signature $S_k(t)$ and a target force $F^{target}(t)$;
   calculating a noise operator $\Omega_{k+1}(t)$ by deconvolving the noise component $N_k(t)$ by the target force $F^{target}(t)$;
   generating an anti-noise correction $P_{k+1}^{corr}(t)$ for the initial pilot signal $P_k(t)$ by convolving the noise operator $\Omega_{k+1}(t)$ with the initial pilot signal $P_k(t)$; and
   computing a modified pilot signal based on the initial pilot signal $P_k(t)$ and the anti-noise correction $P_{k+1}^{corr}(t)$,
   wherein a subscript k indicates an iteration of calculations.

2. The method of claim 1, further comprising
   outputting a portion of the modified pilot signal to a seismic source;
   receiving a real-time source signature based on the portion of the modified pilot signal; and
   calculating a real-time anti-noise correction based on the real-time source signature.

3. The method of claim 1, further comprising utilizing the modified pilot signal in a seismic survey.

4. The method of claim 1, further comprising generating an image of a subsurface formation based on the modified pilot signal.

5. The method of claim 1, further comprising computing the modified pilot signal by subtracting from the initial pilot signal a scalable fraction of the anti-noise correction.

6. The method of claim 1, wherein the source signature is a combination of one or more measured motions of one or more actuating parts of the seismic source.

7. The method of claim 6, wherein the combination of one or more measured motions weights each measured motion by the mass of its respective actuating part of the seismic source.

8. The method of claim 1, wherein the source signature is derived from a near-field measurement.

9. A seismic energy emission system, comprising:
a seismic vibratory source; and
a computing system communicatively coupled to the seismic vibratory source, the computing system comprising:
  a processor;
  a memory communicatively coupled to the processor; and
  instructions stored in the memory that, when executed by the processor, cause the processor to:
    generate an initial pilot signal $P_k(t)$ for the seismic vibratory source;
    receive a source signature $S_k(t)$ corresponding to the initial pilot signal $P_k(t)$;
    estimate a noise component $N_k(t)$ of the source signature $S_k(t)$ based on the source signature $S_k(t)$ and a target force $F^{target}(t)$;
    calculate a noise operator $\Omega_{k+1}(t)$ by deconvolving the noise component $N_k(t)$ by the target force $F^{target}(t)$;
    generate an anti-noise correction $P_{k+1}^{corr}(t)$ to the initial pilot signal $P_k(t)$ by convolving the noise operator $\Omega_{k+1}(t)$ with the initial pilot signal $P_k(t)$; and
    compute a modified pilot signal based on the initial pilot signal $P_k(t)$ and the anti-noise correction $P_{k+1}^{corr}(t)$,
    wherein a subscript k indicates an iteration of calculations.

10. The seismic energy emission system of claim 9, wherein the instructions, when executed by the processor, further cause the processor to:
  output a portion of the modified pilot signal to a seismic source;
  receive a real-time source signature based on the portion of the modified pilot signal; and
  calculate a real-time anti-noise correction based on the real-time source signature.

11. The seismic energy emission system of claim 9, wherein the instructions, when executed by the processor, further cause the processor to utilize the modified pilot signal in a seismic survey.

12. A non-transitory computer-readable medium, comprising computer-executable instructions carried on the computer-readable medium, wherein the instructions, when executed by a processor, cause the processor to:
  generate an initial pilot signal $P_k(t)$ for a seismic vibratory source;
  receive a source signature $S_k(t)$ corresponding to the initial pilot signal $P_k(t)$;
  estimate a noise component $N_k(t)$ of the source signature $S_k(t)$ based on the source signature $S_k(t)$ and a target force $F^{target}(t)$;
  calculate a noise operator $\Omega_{k+1}(t)$ by deconvolving the noise component $N_k(t)$ by the target force $F^{target}(t)$;
  generate an anti-noise correction $P_{k+1}^{corr}(t)$ to the initial pilot signal $P_k(t)$ by convolving the noise operator $\Omega_{k+1}(t)$ with the initial pilot signal $P_k(t)$; and
  compute a modified pilot signal based on the initial pilot signal $P_k(t)$ and the anti-noise correction $P_{k+1}^{corr}(t)$,
  wherein a subscript k indicates an iteration of calculations.

13. The non-transitory computer-readable medium of claim 12, wherein the instructions, when executed by the processor, further cause the processor to
  output a portion of the modified pilot signal to a seismic source;
  receive a real-time source signature based on the portion of the modified pilot signal; and
  calculate a real-time anti-noise correction based on the real-time source signature.

14. The non-transitory computer-readable medium of claim 12, wherein the instructions, when executed, further cause the processor to utilize the modified pilot signal in a seismic survey.

* * * * *